United States Patent [19]

Hanna et al.

[11] Patent Number: 5,102,843
[45] Date of Patent: Apr. 7, 1992

[54] CATALYST AND CATALYTIC PROCESS FOR PREPARATION OF POLYKETONES

[75] Inventors: Paul K. Hanna, East Windsor, N.J.; Andrzej M. Piotrowski, Peekskill, N.Y.

[73] Assignee: Akzo NV, Arnhem, Netherlands

[21] Appl. No.: 686,090

[22] Filed: Apr. 16, 1991

[51] Int. Cl.$^5$ ............................................. B01J 31/24
[52] U.S. Cl. ................................... 502/154; 502/155; 528/392
[58] Field of Search ............................... 502/154, 155

[56] References Cited

U.S. PATENT DOCUMENTS

| 4,528,278 | 7/1987 | Hsu | 502/154 X |
| 4,818,810 | 4/1989 | Drent | 502/154 X |
| 5,026,674 | 6/1991 | Brown et al. | 502/154 |

Primary Examiner—Patrick P. Garvin
Attorney, Agent, or Firm—Richard P. Fennelly; Louis A. Morris

[57] ABSTRACT

Polyketone copolymers can be formed by polymerizing carbon monoxide and an olefin in the presence of a Group VIII metal (e.g., palladium) complex containing a bis(diphenylphosphino)ferrocene bidentate ligand and an anion of an acid having a pKa of less than 2 (e.g., para-toluenesulfonic acid).

6 Claims, No Drawings

CATALYST AND CATALYTIC PROCESS FOR PREPARATION OF POLYKETONES

BACKGROUND OF THE INVENTION

The instant invention relates to a catalytic process for the preparation of polyketones which are copolymers of carbon monoxide and an olefin.

U.S. Pat. No. 4,818,810 to E. Drent describes the synthesis of polyketones using a Group VIII metal complex containing bidentate ligands connected to a Group VA element and an anion of an acid having a pKa of less than 2. One speculative example of a suitable bidentate ligand that is presented at Col. 3, lines 52-59 is the structure $[(C_6H_5)_2PC_6H_4]_2Fe$.

SUMMARY OF THE INVENTION

The catalyst used in the present invention for the manufacture of polyketones is a Group VIII metal complex containing a bis(diphenylphosphino)ferrocene bidentate ligand and an anion of an acid having a pKa of less than 2.

DETAILED DESCRIPTION OF THE INVENTION

The catalyst system of the present invention is analogous to the type of system described in U.S. Pat. No. 4,818,810, which is incorporated herein by reference, in a number of respects with the exception of the use of the novel bidentate ligand used herein. The catalyst is prepared by combining the Group VA element-containing bidentate ligand, a salt of the Group VIII metal, and an acid having a pKa of less than 2 to ultimately form the complex.

The bidentate ligand connected to a Group VA element (e.g., phosphorus, arsenic or antimony) used herein is a bis(diphenylphosphino)ferrocene compound of the general formula

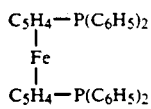

where $C_5H_4$ is representative of substituted cyclopentadienyl rings which, with the associated iron atom, form the ferrocene coordination compound to which the diphenylphosphino substituents are attached. A representative, commercially available compound of this type is 1,1'-bis(diphenylphosphino) ferrocene.

The salt of the Group VIII metal which can be used herein encompasses those shown in U.S. Pat. No. 4,818,810. Palladium, nickel and cobalt compounds are representative with the palladium salts being preferred. The anion can be derived from such acids as nitric, sulfuric, or the alkanoic acids having up to 12 carbon atoms. Palladium acetate is most preferred. The molar amount of palladium compound per mole of olefin to be polymerized can be from about $10^{-8}$ to about $10^{-1}$ mole.

The acid having the pKa of under 2 includes such acids as trifluoroacetic acid, trichloroacetic acid, dichloroacetic acid, difluoroacetic acid, para-toluenesulfonic acid, and the like.

When the above-described bidentate ligand, salt of Group VIII metal, and acid are combined and reacted to form a metal complex (e.g., under nitrogen atmosphere in a suitable deoxygenated solvent such as acetone), a composition is formed which has a relatively poor catalytic activity for polyketone formation. This composition (termed a "pre-catalyst" in the Examples given below) can be suitably activated to yield the desired catalyst of the present invention.

Activation of the pre-catalyst can be accomplished in a variety of ways. For example, reaction of the pre-catalyst with carbon monoxide under pressure has been found to be one means to change the purple pre-catalyst to a red-yellow composition having good polymerization activity. The use of hydrogen gas under pressure is another means to activate the pre-catalyst. A third way in which to activate the pre-catalyst is to treat it with a trialkylsilane, such as triethylsilane.

The polymerization conditions to be used with the catalyst of the present invention can encompass those described in U.S. Pat. No. 4,818,810: preferred temperatures of 50-150° C. under preferred pressures of 2-75 bar.

The present invention is further understood by the Examples which follow.

EXAMPLE 1

In a clean, dry flask was placed 0.11 g of palladium acetate, 0.23 g of para-toluenesulfonic acid, and 0.55 g of 1,1'-bis(diphenylphosphino)ferrocene. The flask was evacuated to 0.05 torr and was refilled with nitrogen three times. To this was added 20 ml of dry, deoxygenated acetone. The solution immediately became purple. The flask was then evacuated to 0.05 torr, and all the solvent was removed. The resulting pre-catalyst composition was a purple solid.

The pre-catalyst was then dissolved in 2 liters of dry degassed acetone at 30° C. It was then activated by pressurizing it with carbon monoxide to 3 bar for two hours. After two hours, the pressure was released. The solution was then pressurized to 68 bar with a 1:1 mixture of high purity carbon monoxide and ethylene. The temperature was then raised to 65° C. The mixture was stirred under these conditions for sixteen hours. After this time the pressure was released and the vessel cooled. The product was filtered from the suspension. It was an off white solid weighing 32 g. Its limiting viscosity was 2.0.

EXAMPLE 2

In a clean, dry flask was placed 0.11 g of palladium acetate, 0.23 g of para-toluenesulfonic acid, and 0.55 g of 1,1'-bis(diphenylphosphino)ferrocene. The flask was evacuated to 0.05 torr and refilled with nitrogen three times. To this was added 20 ml of dry, deoxygenated acetone. The solution immediately became purple. The flask was then evacuated to 0.05 torr and all the solvent was removed. The pre-catalyst was a purple solid.

The pre-catalyst was then dissolved in 2 liters of dry degassed acetone at 30° C. The pre-catalyst was activated by pressurizing it with hydrogen to 17 bar for two hours. After two hours the solution was pressurized to 68 bar with a 1:1 mixture of high purity carbon monoxide and ethylene. The temperature Was then raised to 65° C. The mixture Was stirred under these conditions for 17 hours. After this time the pressure was released and the vessel cooled. The product was filtered from the suspension. It was a white solid weighing 152 g. Its limiting viscosity was 0.1.

EXAMPLE 3

The pre-catalyst was prepared as in Example 1. It was dissolved in 150 ml of degassed acetone and pressurized to 3 bar with carbon monoxide. The solution turned from purple to yellow-red in about two hours at 27° C. During this time, 35 g of CO/ethylene copolymer produced in Example 1 was wetted with 50 ml of acetone. The catalyst solution was then coated on the polymer and then the solvent was removed under vacuum. The resulting powder was placed in an autoclave. The autoclave was degassed by pressurizing to 4 bar with nitrogen and releasing, this being repeated ten times. The autoclave was then pressurized to 68 bar with a 1:1 mixture of carbon monoxide and ethylene. The autoclave was then heated to 65° C. for eighteen hours. After cooling and releasing the pressure, the product was isolated as an off-white powder weighing 71 g. After storing this product in the air for three days, it was placed back in an autoclave, degassed, heated to 65° C. and then pressurized to 68 bar with a 1:1 mixture of CO/ethylene. After 60 hours the pressure was released and the temperature brought back to 25° C. The product now weighed 129 g.

EXAMPLE 4

In a clean, dry flask is placed 0.11 g of palladium acetate, 0.23 g of para-toluenesulfonic acid, and 0.55 g of 1,1'-bis(diphenylphosphino)ferrocene. The flask was evacuated to 0.05 torr and refilled with nitrogen three times To this was added 20 ml of dry, deoxygenated acetone. The solution immediately became purple. The flask was then evacuated to 0.05 torr, and all the solvent was removed. The pre-catalyst was a purple solid.

The pre-catalyst was then dissolved in 250 ml of dry degassed acetone at 30° C. The pre-catalyst was activated by pressurizing it with carbon monoxide to 3 bar for two hours. After two hours, the pressure was released. The solution was then pressurized to 3 bar with a 1:1 mixture of high purity carbon monoxide and ethylene The temperature was maintained at 30° C. The mixture was stirred under these conditions for sixteen hours. After this time, the pressure was released. The product was filtered from the suspension. It was an off-white solid weighing 1.3 g.

EXAMPLE 5

In a clean, dry flask was placed 0.11 g of palladium acetate, 0.23 g of para-toluenesulfonic acid, and 0.55 g of 1,1'-bis(diphenylphosphino)ferrocene. The flask was evacuated to 0.05 torr and refilled with nitrogen three times. To this was added 20 ml of dry, deoxygenated acetone. The solution immediately became purple. The flask was then evacuated to 0.05 torr, and all the solvent was removed. The pre-catalyst was a purple solid.

The pre-catalyst was then dissolved in 250 ml of dry degassed acetone at 30° C. The pre-catalyst was not activated. The solution was then pressurized to 3 bar with a 1:1 mixture of high purity carbon monoxide and ethylene. The temperature was maintained at 30° C. The mixture was stirred under these conditions for sixteen hours. After this time, the pressure was released. The product was filtered from the suspension. It was an purple-brown solid weighing 0.3 g.

The foregoing Examples, since they merely set forth certain embodiments of the instant invention, should not be construed in a limiting sense. The scope of protection sought is set forth in the claims which follow.

We claim:

1. A catalyst for the formation of a polyketone comprising a Group VIII metal complex containing a bis(diphenylphosphino) ferrocene bidentate ligand and an anion of an acid having a pKa of less than 2.

2. A catalyst as claimed in claim 1 wherein the Group VIII metal is palladium.

3. A catalyst as claimed in claim 1 wherein the acid is para-toluenesulfonic acid.

4. A catalyst as claimed in claim 1 wherein the ligand is a bis(1,1'-diphenylphosphino) ferrocene bidentate ligand.

5. A catalyst as claimed in claim 1 wherein the Group VIII metal is palladium and the acid is para-toluenesulfonic acid.

6. A catalyst as claimed in claim 4 wherein the Group VIII metal is palladium and the acid is para-toluenesulfonic acid.